Feb. 3, 1970   C. A. FAUTALE   3,493,878
SELF-RESETTING OVERLOAD PROTECTION CIRCUIT FOR TRANSISTORS
Filed Feb. 3, 1967
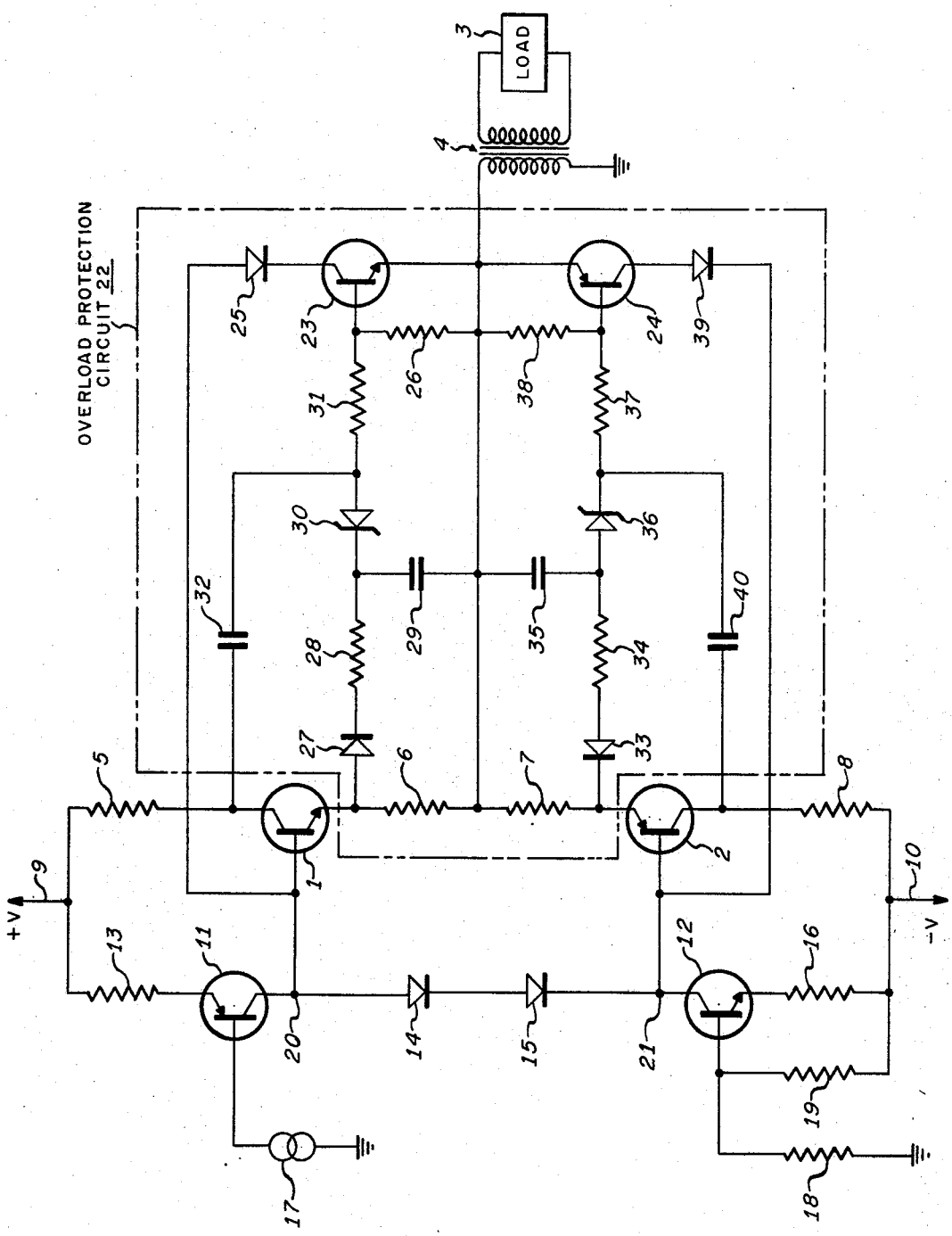
INVENTOR.
CHARLES A. FAUTALE
BY
  Robert J Heare
ATTORNEY

United States Patent Office 3,493,878
Patented Feb. 3, 1970

3,493,878
SELF-RESETTING OVERLOAD PROTECTION CIRCUIT FOR TRANSISTORS
Charles A. Fautale, Brooklyn, N.Y., assignor to Sperry Rand Corporation, a corporation of Delaware
Filed Feb. 3, 1967, Ser. No. 613,777
Int. Cl. H03f 21/00
U.S. Cl. 330—11         5 Claims

ABSTRACT OF THE DISCLOSURE

A circuit for protecting a transistor against overload by the provision of a switching transitor connected across the base and emitter of the protected transistor. A resistor in the emitter circuit of the protected transistor provides a pulse in the presence of overload current which charges a first capacitor toward the breakdown voltage of a Zener diode. The breakdown of the Zener diode discharges the first capacitor by triggering the switching transistor into conduction, thus limiting the base drive of the protected transistor to a safe level. A second capacitor coupled between the collector of the protected transistor and the base of the switching transistor regeneratively aids the rapid limiting of base drive to the protected transistor upon the occurrence of an overload. The recovery of the Zener diode after the discharge of the first capacitor initiates a new cycle of operation only if the overload persists.

---

The invention herein described was made in the course of or under a contract or subcontract thereunder, with the Department of the Navy.

BACKGROUND OF THE INVENTION

As is well known, transistors are susceptible to permanent damage in the event that they are subjected to overload current surges or to excessive average power dissipation. Consequently, it is desired to provide a protection circuit which quickly responds to momentarily high amplitude current surges through the protected transistor as well as to lesser amplitude currents which persist for a period sufficient to cause excessive average power dissipation. In many instances, it also is desired that the protection circuit automatically restore normal operation of the protected transistor as soon as the overload condition ceases.

SUMMARY OF THE INVENTION

The circuit of the present invention serves to protect a transistor against overload conditions by periodically limiting the current flowing through the protected transistor for such a time as the overload condition prevails. Upon the occurrence of an overload, an astable oscillating condition is initiated in the protection circuit whereby the base signal input to the protected transistor is alternately shorted and unshorted to ground. Oscillations are asymmetrical in that the length of time of the shorted condition is long relative to the length of time of the unshorted condition. As soon as the overload condition ceases, the astable operation of the protection circuit automatically terminates and the base signal input to the protected transistor is re-established to permit the resumption of normal operation.

BRIEF DESCRIPTION OF THE DRAWINGS

The sole figure is a schematic diagram of a preferred embodiment of the invention adapted for the protection of a push-pull transistor power amplifier.

DESCRIPTION OF THE PREFERRED EMBODIMENT

Referring to the drawing, the circuit to be protected by the present invention comprises complementary transistors 1 and 2 which drive the same load 3 via transformer 4. Transistors 1 and 2 are connected in a series circuit by resistors 5, 6, 7 and 8 between a source of positive potential (not shown) at terminal 9 and a source of negative potential (not shown) at terminal 10. For the sake of exemplification, the protected transistors 1 and 2 are shown driven by a driver stage comprised of transistors 11 and 12 which are coupled in series circuit by resistor 13, diodes 14 and 15 and resistor 16 between terminals 9 and 10. The signal input is provided by source 17 connected between the base of transistor 11 and ground. The base of transistor 12 is connected to ground via resistor 18 and is connected to terminal 10 via resistor 19. The combination of transistor 12 and resistors 16, 18 and 19 acts as a current source.

Under normal operations, the voltages at junctions 20 and 21 are approximately the same and swing together in either the positive or negative direction, depending upon the signal from alternating signal source 17. Quiescent conditions are such that the potentials at junctions 20 and 21 are approximately +0.6 volt and —0.6 volt respectively. Complementary transistors 1 and 2 thus are driven in a conventional push-pull manner with one transistor or the other conducting at a given time in accordance with the polarity of the driving signal which is applied to the two bases.

There is now to consider the overloading effects on transistors 1 and 2 that would be produced under representative circuit failure conditions. Assume that the driver and power amplifier stages are energized by two separate sources and that one of the sources, say the positive source, is turned on before the negative source. In this event, the potential at junction 20 momentarily is much higher than is normally the case due to the failure of transistor 12 to conduct before the negative source is turned on. The elevated positive potential at terminal 20 drives transistor 1 into an overload condition which, if unchecked, would quickly result in the destruction of the transistor. Similar destruction of transistor 2 would follow in the event that the negative power source at terminal 10 was turned on prior to the positive power source at terminal 9.

Another representative circuit failure condition to consider is the situation where both the positive and the negative sources are turned on at the same time and a signal is provided by source 17 but load 3 is short-circuited. The short-circuiting of the load and the consequent loss of signal impedance in the primary coil of transformer 4 results in the simultaneous increase in the amplitudes of the signal drops across transistors 1 and 2. The increased signal drops cause a corresponding increase in the power dissipation and temperature of transistors 1 and 2 which, if unchecked, would rapidly lead to the destruction of transistors 1 and 2.

The protection circuit 22 of the present invention is designed to safeguard in a quick and efficient manner against all overload conditions imposed on transistors 1 and 2. Circuit 22 comprises transistors 23 and 24 in the case of the disclosed preferred embodiment wherein a push-pull transistor amplifier is to be protected. As will be seen, the present invention equally is suitable for the protection of a single transistor in which case only one of transistors 23 and 24 and its associated components would be necessary. The collector of npn transistor 23 is coupled via diode 25 to the base of transistor 1. Resistor 26, connected between the base and emitter terminals of transistor 23, prevents transistor 23 from turning on because of leakage currents. The collector to emitter junction of transistor 23 is biased towards conduction whenever the potential of junction 20 rises positively from ground potential. Transistor 23, however, is rendered conductive only upon the further condition that the base is rendered positive with respect to the emitter. Provision for the satisfaction of said further condition is made by components 27, 28, 29, 30 and 31. Diode 27, resistor 28 and capacitor 29 are connected in series circuit across resistor 6 in the emitter circuit of transistor 1. Zener diode 30 and resistors 31 and 26 are connected in series circuit across capacitor 29. The junction between Zener diode 30 and resistor 31 is connected to the collector of transistor 1 via capacitor 32. Symmetrically equivalent connections are made between components 33, 34, 35, 36, 37, 38, 39, 40 and transistors 2 and 24.

For the sake of simplicity, the operation of overload protection circuit 22 to be described will be limited to that half of the total symmetrical circuit which involves transistors 1 and 23. The operation of the other symmetrical half of protection circuit 22 involving transistors 2 and 24 is fully equivalent. Upon the occurrence of an overload condition affecting transistor 1, a current surge through resistor 6 develops a potential drop which charges capacitor 29 through diode 27 and resistor 28. The increasing potential across capacitor 29 is in a direction back-biasing Zener diode 30 towards breakdown through resistors 31 and 26. Prior to the occurrence of the overload condition, transistor 23 is cut-off and capacitor 32 is charged to the positive potential at terminal 9, less the D.C. voltage drop across resistor 5. Upon the occurrence of the overload condition, the current surge through resistor 5 produces a negative-going pulse at the collector of transistor 1 which is coupled through capacitor 32 and resistor 31 to the base of transistor 23 driving transistor 23 further into cut-off. Capacitor 32 rapidly discharges through resistors 5, 31 and 26 and the primary of transformer 4 to the reduced potential at the collector of transistor 1 during overload and permits the base of transistor 23 to recover quickly from its momentary negative potential.

The increasing positive potential across capacitor 29 and the recovering potential at the base of transistor 23 provide an increasing back-bias potential across Zener diode 30 sufficient to cause breakdown. Capacitor 29 discharges through diode 30 (which requires a reduced potential to sustain breakdown once initiated), resistor 31 and the parallel combination of resistor 26 and base-to-emitter resistance of transistor 23 to provide a potential across resistor 26 sufficient to turn on transistor 23. The conduction of transistor 23 presents a low impedance path between the base of transistor 1 and ground tending to shunt the base drive of transistor 1 to ground. The reduced condition of transistor 1 causes an increased positive potential to appear at the collector which couples through capacitor 32 and resistor 31 to the base of transistor 23 turning the latter full on in a rapid regenerative manner. The fast triggering of transistor 23 into full conduction limits conduction in transistor 1 to a permissible level.

Transistor 23 remains conductive for a period of time required for discharge of capacitor 29 to a reduced value insufficient to sustain the continued conduction of the Zener diode. Upon the extinction of conduction in the Zener diode, transistor 23 begins to revert to its original off condition. The reduced conduction of transistor 23 begins to allow the reapplication of signal drive and the renewed conduction of transistor 1. Increased conduction in transistor 1 produces a falling positive potential at the collector thereof which is coupled through capacitor 32 and resistor 31 to the base of transistor 23 accelerating the turn off of transistor 23 in a regenerative manner. Thus, the regeneration afforded by capacitor 32 assists in the rapid turn on of transistor 23 upon the occurrence of an overload condition and also assists in the subsequent rapid turn off of transistor 23.

The response of circuit 22 to the occurrence of an overload condition is determined by the charging time constant of the circuit consisting of elements 6, 27, 28 and 29. Said time constant is made as short as is consistent with the avoidance of unwanted triggering of the protection circuit 22 due to spurious noise spikes or of other short transients which would not damage transistor 1 if unchecked. The length of time that transistor 1 is held off following the conduction of transistor 23 is determined by the discharge time constant of capacitor 29 and the resistance values of diode 30 (when in breakdown), resistors 31 and 26, and the base-to-emitter resistance of transistor 23. In the event that the overload condition persists after the first cycle of operation of overload protection circuit 22, a new cycle is initiated. In this fashion, transistor 1 is allowed to conduct for a relatively short period and is held near cut-off for a relatively long period, i.e., transistor 1 is permitted to operate with a low duty cycle, as long as the overload condition prevails. Normal operation of transistor 1 is permitted to resume upon the first turn off of transistor 23 following the termination of the overload condition.

In effect, overload protection circuit 22 very rapidly reduces conduction in the protected transistor 1 to a safe value upon the occurrence of an overload condition and then periodically senses whether the overload condition still persists by permitting periodic full conduction of the protected transistor for short durations. Each cyclical check of the protected transistor either initiates a new cycle of operation of the overload protection circuit (if the overload condition continues) or restores normal operation of the protected transistor (in the event that the overload condition has terminated). An important additional feature of the invention is that overload protection circuit 22 draws no power when there is no overload condition.

While the invention has been described in its preferred embodiments, it is to be understood that the words which have been used are words of description rather than limitation and that changes within the purview of the appended claims may be made without departing from the true scope and spirit of the invention in its broader aspects.

What I claim is:

1. A protection circuit for protecting a first transistor against an overload condition manifested by an increased current through said first transistor above a predetermined value, said first transistor having a base connected to receive an input signal and emitter and collector output electrodes connected in an output circuit; said protection circuit comprising first impedance means connected serially in the output circuit of said first transistor for generating a rising potential in response to a rising current in said first transistor; a capacitor; second impedance means coupling said capacitor to said first impedance means, whereby said capacitor is charged by said rising potential; a breakdown device having a high impedance when subjected to a potential in a range of values, and a low impedance when subjected to a potential above said range after a critical potential has been exceeded; third impedance means coupled in series circuit with said device across said capacitor; a voltage tap on said third impedance means; and a second transistor having a base, emitter, and collector; the base and emitter of said second transistor being coupled between the tap and one end of said third impedance means, the collector and emitter of said second transistor being coupled to the base and emitter of said first transistor so as to divert current through said second transistor and around said first transistor when said second transistor is in a conducting state; said first and second impedance means being proportioned to increase the charge or said capacitor to a potential above the critical potential of said breakdown device when the current through said first transistor exceeds said predetermined value; the tap on said third impedance means being adjusted to drive said second transistor into conduction when said breakdown device is driven into its low impedance state.

2. A circuit as defined in claim 1 wherein said breakdown device is a Zener diode.

3. A circuit as defined in claim 1 wherein said second impedance means includes a diode.

4. A circuit as defined in claim 1 in which said first impedance means is connected to one of said output electrodes of said first transistor, said circuit further including fourth impedance means connected to the other of said electrodes of said first transistor for generating a potential drop in response to rising current in said transistor, and a second capacitor, said second capacitor being connected between the junction of said fourth impedance means with said other output electrode and the junction of said breakdown device with said third impedance means.

5. A circuit as defined in claim 4 wherein said first impedance means is connected to said emitter of said first transistor and said fourth impedance means is connected to said collector of said first transistor.

References Cited

UNITED STATES PATENTS

| | | | |
|---|---|---|---|
| 2,971,102 | 2/1961 | Schultz | 307—202 X |
| 3,109,980 | 11/1963 | Wiley | 307—202 X |
| 3,303,386 | 2/1967 | Murphy | 307—202 X |

NATHAN KAUFMAN, Primary Examiner

U.S. Cl. X.R.

330—13, 14, 18, 24